(12) United States Patent
Thompson et al.

(10) Patent No.: US 8,484,140 B2
(45) Date of Patent: Jul. 9, 2013

(54) FEATURE VECTOR CLUSTERING

(75) Inventors: Donald Thompson, Sammamish, WA (US); Alexander S. Stojanovic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 12/480,831

(22) Filed: Jun. 9, 2009

(65) Prior Publication Data

US 2010/0312726 A1    Dec. 9, 2010

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 5,754 A * | 9/1848 | Watanabe et al. | 26/92 |
| 5,090,418 A * | 2/1992 | Squires et al. | 600/515 |
| 6,711,585 B1 | 3/2004 | Copperman et al. | |
| 7,072,948 B2 | 7/2006 | Yen et al. | |
| 7,246,128 B2 | 7/2007 | Jordahl | |
| 7,401,057 B2 * | 7/2008 | Eder | 706/20 |
| 2002/0159640 A1 * | 10/2002 | Vaithilingam et al. | 382/218 |
| 2005/0267864 A1 | 12/2005 | Pope et al. | |
| 2006/0004891 A1 | 1/2006 | Hurst-Hiller et al. | |
| 2006/0074821 A1 * | 4/2006 | Cristianini | 706/12 |
| 2006/0242139 A1 | 10/2006 | Butterfield et al. | |
| 2008/0104521 A1 | 5/2008 | Dubinko et al. | |
| 2008/0133475 A1 | 6/2008 | Fischer | |
| 2008/0162498 A1 | 7/2008 | Omoigui | |
| 2010/0250515 A1 * | 9/2010 | Ozonat et al. | 707/709 |

OTHER PUBLICATIONS

User Profiling for the Web Miha Grčar1, Dunja Mladenič1, Marko Grobelnik1 1 J.Stefan Institute, Jamova 39, 1000 Ljubljana, Slovenia {miha.grcar, dunja.mladenic, marko.grobelnik}@ijs.si.*
Automatic Tag Recommendation Algorithms for Social Recommender Systems Yang Song Department of Computer Science and Engineering The Pennsylvania State University.*
Shekar et al., "A Fuzzy-Graph-Based Approach to the Determination of Interestingness of Association Rules", http://www.dke.univie.ac.at/pakm2002/Vortraege/Track8_Vortrag4_Shekar_Natarajan.pdf.pdf.
Bollacker et al., "Discovering Relevant Scientific Literature on the Web", 2000, pp. 42-47, http://clgiles.ist.psu.edu/papers/Intelligent-Systems-2000-rel-sci-lit.pdf.
Chen et al., "Footprints of Information Foragers: Behaviour Semantics of Visual Exploration", Int. J. Human-Computer Studies (2002) 57, 139-163, http://dspace.library.drexel.edu/bitstream/1860/1948/1/2006175223.pdf.

* cited by examiner

*Primary Examiner* — Kakali Chaki
*Assistant Examiner* — Ababacar Seck
(74) *Attorney, Agent, or Firm* — Microsoft Corporation

(57) ABSTRACT

One goal of computer services (e.g., email, web pages, blogs, advertisements, etc.) is to provide a user with Kinds (digital representations of everyday things) that may be relevant and interesting to the user. Users and Kinds may be plotted within a multidimensional matrix as feature vectors based upon their respective characteristics. An unsupervised clustering technique may be executed upon the matrix to create a mathematical cluster of feature vectors having similar characteristics. For example, a clothing cluster may comprise a dress Kind, a shoe Kind, a wool Kind, a watch Kind, etc. because the unsupervised clustering technique may determine these Kinds are plotted within the matrix in such a way that they have similar characteristics relating to clothing. The unsupervised clustering technique may also be utilized in determining which Kinds may be relevant to a user given a particular context with which a user is engaged with a computer resource.

20 Claims, 9 Drawing Sheets

FEATURE VECTOR CLUSTERING

BACKGROUND

Many users interact with computer resources daily. The user's experience of these computer resources may involve navigation, discovery, and interaction with data items (e.g., files, emails, images, web searches, etc.). For example, the user may access their work email or perform a web search using a mobile device. Unfortunately, the user's experience may be limited because the devices through which the user and computer resources interact may not understand the user's interests, detailed information of the data items with which the user interacts, and/or the context with which the user interacts with the data items. For example, when a user checks their calendar for an upcoming trip through a work computer, the work computer may not understand the context of the user's interactions and thus may not understand that it may be advantageous to provide the user with additional information, such as itinerary information.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a technique for determining a relevancy between one or more Kinds and a user and a technique for creating a mathematical cluster of similar feature vectors is disclosed herein. It may be appreciated that a Kind may be interpreted as a digital representation of everyday things, such as a data structure defining a car. Characteristics of a Kind and a user may be represented as Kind feature vectors and user feature vectors, which may be plotted within a matrix based upon their respective characteristics. The matrix may be, for example, a data structure representing a multidimensional space, wherein dimensions correspond to characteristics that Kinds and/or users may relate to in varying degrees. Matrix operations, such as unsupervised clustering techniques, may be executed upon the matrix to determine relevancy and/or similarity between Kinds and/or users.

In determining relevancy, a user context may be determined when a user interacts with a computer resource (e.g., an office context may be determined when the user opens their work email). An unsupervised clustering technique may be utilized to classify one or more Kind feature vectors as relevant with respect to a user feature vector in view of the user context. The user context may be taken into account to further determine what Kind feature vectors are relevant. That is, if a user is within an office context, then Kind feature vectors relating to office may be more relevant, for example. In one example, relevancy may be determined based upon executing the unsupervised clustering technique upon the matrix, such that feature vectors closer to one another may be interpreted as more relevant than feature vectors further away from one another because feature vectors closer to one another may comprise similar characteristics that may be relevant in view of the user context.

The unsupervised clustering technique, for example, may comprise a cosine similarity operation, a Laplacian, a Euclidian distance, a Kernal method, an SVM framework, and/or other techniques that may be executed upon the matrix. The unsupervised clustering techniques may be executed upon the matrix to create a mathematical cluster comprising one or more Kind feature vectors. The one or more Kind feature vectors may comprise characteristics that are relevant to characteristics of the user feature vector in view of the user context, thus the one or more Kind feature vectors may be classified as relevant with respect to the user feature vector.

A technique for creating a mathematical cluster of feature vectors based upon a similarity metric is disclosed herein. A mathematical cluster comprising one or more feature vectors may be created using an unsupervised clustering technique in view of a similarity metric. In one example, a feature vector may represent characteristics that a Kind (e.g., a Kind feature vector) or a user (e.g., a user feature vector) may relate to. The feature vectors may be plotted within a matrix based upon their respective characteristics. The unsupervised clustering technique may be executed upon the matrix to create the mathematical cluster of similar feature vectors based upon their position within the matrix with respect to one another. For example, an unsupervised clustering technique may create a mathematical cluster comprising Kind feature vectors relating to sports based upon a sports similarity metric. The unsupervised clustering technique may determine which Kind feature vectors comprise characteristics relating to sports based upon their distance from one another within the matrix, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
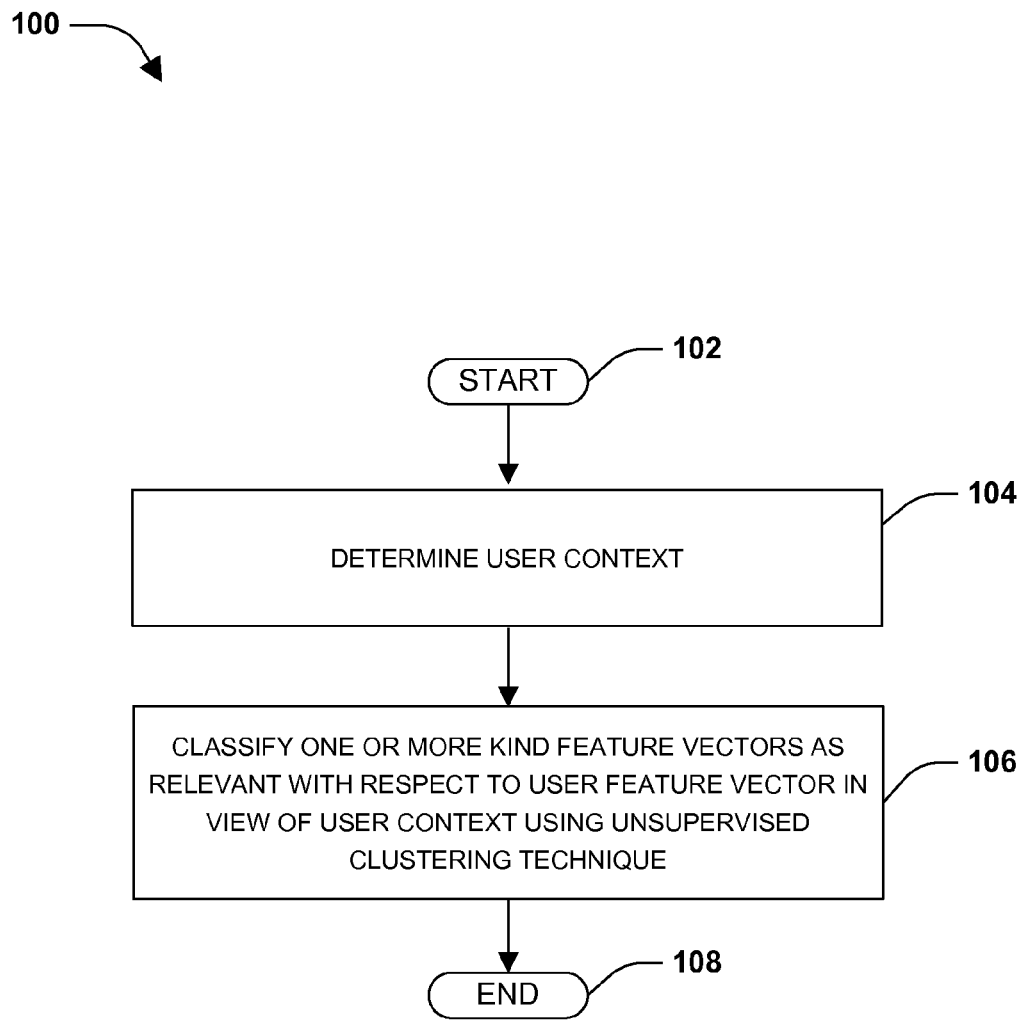
FIG. 1 is a flow chart illustrating an exemplary method of determining a relevancy between one or more Kinds and a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A user's experience of computer resources may involve interacting with data items (e.g., web content, local content, subscription content, and/or shared content). The user's experience may be enhanced by understanding the user's interests and classifying data items with which the user interacts. For example, if a user writes an email regarding the use of orange peels as an air freshener, then a digital representation of an orange (e.g., an orange Kind) may be classified as relating to an air freshener and/or a home cleaning product. The user may also be classified as having an interest in air fresheners and/or home cleaning products. This classification technique allows additional information and more advanced interactions to be presented to users.

A Kind may be interpreted as the digital representation of everyday things (e.g., a desk Kind may be a digital representation of a desk; an orange Kind may be a digital representation of an orange—the color and/or the fruit). A feature vector may be a data structure representation of the conceptual space within which a Kind (e.g., a Kind feature vector) or a user (e.g., a user feature vector) digitally exists. That is, a feature vector provides information regarding characteristics that a Kind or a user may relate to in varying degrees. Feature vectors may comprise one or more dimensions (e.g., millions of dimensions), wherein a dimension corresponds to a characteristic (e.g., red, wood, sports, office, travel, boat, etc.) that a Kind or a user may relate to in varying degrees. For example, a desk Kind feature vector may have thousands of dimensions (e.g., a wood dimension, a seat dimension, an office dimension, a sport dimension, a boat dimension, etc.). Respective dimensions may comprise probabilistic values from 0 to 1, wherein values close to 0 indicate the feature vector has a low probability of relating to the characteristic of the dimension and values close to 1 indicate the feature vector has a high probability of relating to the characteristic of the dimension.

A technique for classifying feature vectors as relevant to a user and a technique for clustering similar feature vectors into mathematical clusters is provided herein. Feature vectors may be plotted within a matrix. The matrix may be a data structure representing a multidimensional space of characteristics, wherein a dimension corresponds to a characteristic. A feature vector may be plotted as a point within the matrix based upon one or more dimensions of the feature vector (e.g., the plotted location of the point within the matrix may be dependent upon the probabilistic values of the dimensions). The matrix provides a mathematical/graphical representation of one or more feature vectors based upon their characteristics. Unsupervised clustering techniques may be executed upon the matrix to determine relevancy (e.g., one or more Kind feature vectors that are relevant to a user) and similarity (e.g., a mathematical clustering of feature vectors that are similar with respect to one another).

One embodiment of determining a relevancy between one or more Kinds and a user is illustrated by an exemplary method 100 in FIG. 1. At 102, the method begins. At 104, a user context is determined. For example, a travel user context may be determined when a user checks their personal calendar at a time where the user has an upcoming vacation trip. At 106, one or more Kind feature vectors may be classified as relevant with respect to a user feature vector in view of the user context using an unsupervised clustering technique. That is, a Kind represented by a Kind feature vector and a user represented by a user feature vector may be plotted within a matrix using respective characteristics of the Kind and the user. The Kind may be determined as relevant to the user based upon executing the unsupervised clustering technique upon the matrix. For example, Kind feature vectors plotted closer to the user feature vector within the matrix may be determined as relevant, whereas Kind feature vectors plotted further away from the user feature vector may be determined as not relevant. The unsupervised clustering technique may be employed to determine which Kind feature vectors are close to the user feature vector and are thus relevant to the user.

The user context may be taken into account when determining which Kinds (e.g., Kinds represented by Kind feature vectors) are relevant to the user (e.g., a user represented by a user feature vector). For example, thousands of Kind feature vectors may be plotted with a user feature vector within a matrix. The user, as plotted by the user feature vector, may be interested in cars, boats, oranges, work, office supplies, house, and/or thousands of other Kinds in varying degrees. One or more Kinds representing everyday things in which the user is interested along with other Kinds may be plotted within the matrix as Kind feature vectors. The unsupervised clustering technique may determine that a car Kind, a boat Kind, a work Kind, and an office supply Kind are relevant to the user. However, the user context may be travel, thus the boat Kind and the car Kind may be more relevant than the work Kind and the office supply Kind.

In one example of classifying one or more Kind feature vectors, the user feature vector and one or more Kind feature vectors may be plotted within the matrix. A mathematical cluster comprising at least one Kind feature vector within the matrix may be created using the unsupervised clustering technique in view of the user context. For example, the mathematical cluster may be created by computing a metric distance between the user feature vector and the Kind feature vectors within the matrix using the unsupervised clustering technique. The Kind feature vectors within the mathematical cluster may be classified as relevant with respect to the user feature vector.

It may be appreciated that the unsupervised clustering technique may be utilize in deriving partitions (e.g., mathematical cluster) between what is relevant and what is not relevant and/or between what is similar and what is not similar. In one example, the unsupervised clustering technique may be a cosine similarity, such as a dot product or an inner product. In another example, the unsupervised cluster technique may be a Laplacian (e.g., a technique that inverts weights and applies a normalization factor along a diagonal so that all rows within the matrix sum to 1), which may be used as a basis to perform spectral operations upon the matrix (e.g., graph cuts, patricians, clustering, etc.). Other examples of an unsupervised clustering technique may be Euclidian distance, a Kernel method, an SVM framework, a principle component analysis, etc. Forming mathematical clusters within the matrix allows feature vectors to be compared to determine relevancy and/or similarity based upon distance, for example.

One or more Kinds classified as relevant (e.g., a Kind characterized by a Kind feature vector classified as relevant with respect to a user feature vector characterizing a user) may be presented to the user. For example, if a user opens their personal calendar a day before a vacation trip, then an itinerary Kind, a restaurant Kind, and a car rental Kind may be classified as relevant. Information relating to these relevant Kinds may be presented to the user. This allows additional information that is relevant to the user to be presented to the user. At 108, the method ends.

Figure 2:
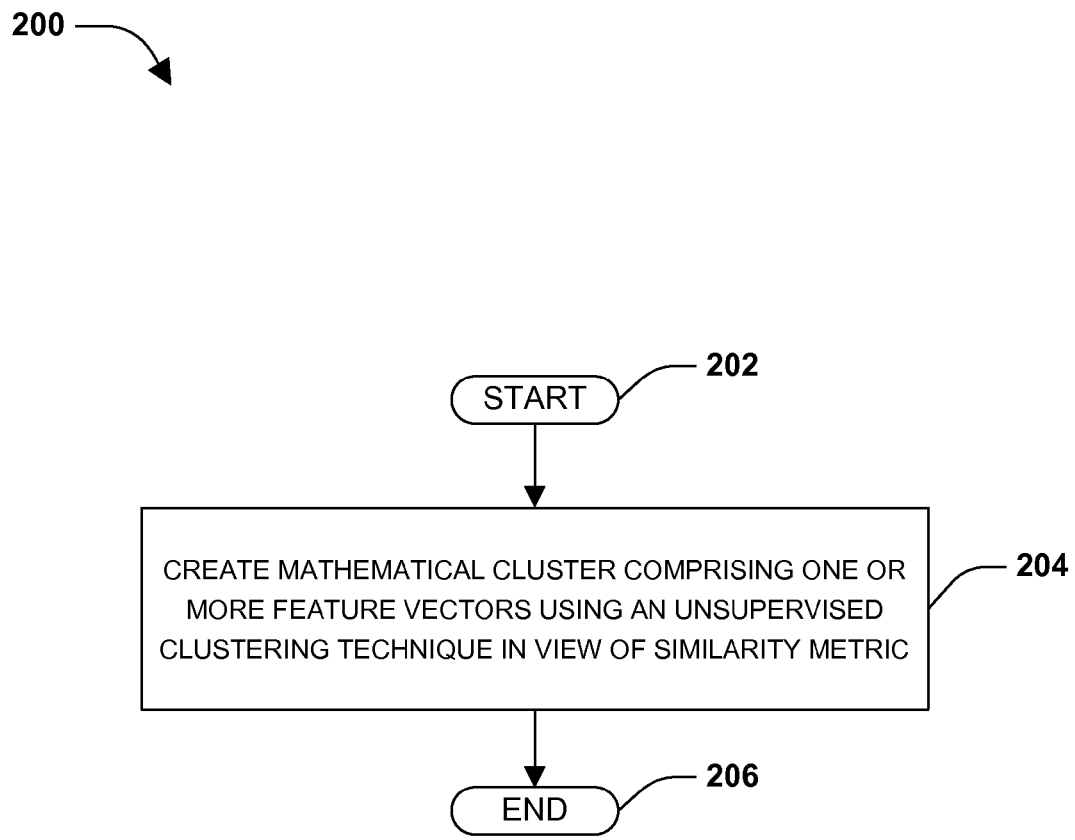
FIG. 2 is a flow chart illustrating an exemplary method of creating a mathematical cluster of feature vectors based upon a similarity metric.

One embodiment of creating a mathematical cluster of feature vectors based upon a similarity metric is illustrated by an exemplary method 200 in FIG. 2. At 202, the method begins. At 204, a mathematical cluster comprising one or more feature vectors may be created using an unsupervised clustering technique in view of a similarity metric. It may be appreciated that the one or more feature vectors within the mathematical cluster may be classified as similar with respect to one another. The similarity metric may comprise one or more characteristics. For example, a similarity metric may comprise a sport characteristic and a ball characteristic, which may be utilized as a reference for determining what feature vectors are similar based upon the similarity metric (e.g., soccer balls, baseballs, footballs, etc.).

Feature vectors may comprise one or more dimensions, wherein a dimension comprises a probabilistic value based upon the probability a Kind or a user of the feature vector relates to a characteristic of the dimension. The spatial location of a feature vector may be based upon respective probabilistic values of a feature vector's dimensions. The unsupervised clustering technique may be executed upon feature vectors plotted within a multidimensional matrix of characteristics based upon the characteristics of the feature vectors as defined by respective dimensions of the feature vectors. The unsupervised clustering technique may group one or more feature vectors into the mathematical cluster based upon characteristics of the one or more feature vectors (e.g., dimensions) being similar to the similarity metric. That is, the unsupervised clustering technique may group feature vectors that are plotted close to one another within the multidimensional matrix in view of the similarity metric because feature vectors located in close spatial relation to one another may exhibit similar characteristics due to being plotted within the multidimensional matrix based upon their characteristics.

A sub-mathematical cluster may be created, wherein the sub-mathematical cluster is a cluster within the mathematical cluster. The sub-mathematical cluster may comprise one or more feature vectors comprising at least one characteristic within a second similarity metric. For example, a mathematical cluster with a similarity metric of cars may comprise a hood, door, window, engine, tire, rim, color, and/or other such feature vectors. A sub-mathematical cluster with a second similarity metric of metal may comprise the hood, the engine, and the rim feature vectors. Thus, mathematical clusters may be hierarchical.

It may be appreciated that the feature vectors may be a user feature vector and/or a Kind feature vector. Thus a similarity between users, between Kinds, and/or between users and Kinds may be determined. It may be appreciated that the unsupervised clustering technique may comprise at least one of a Laplacian, a cosine similarity, a Euclidian distance, a Kernel method, an SVM framework, and/or a principle component analysis.

Figure 3:
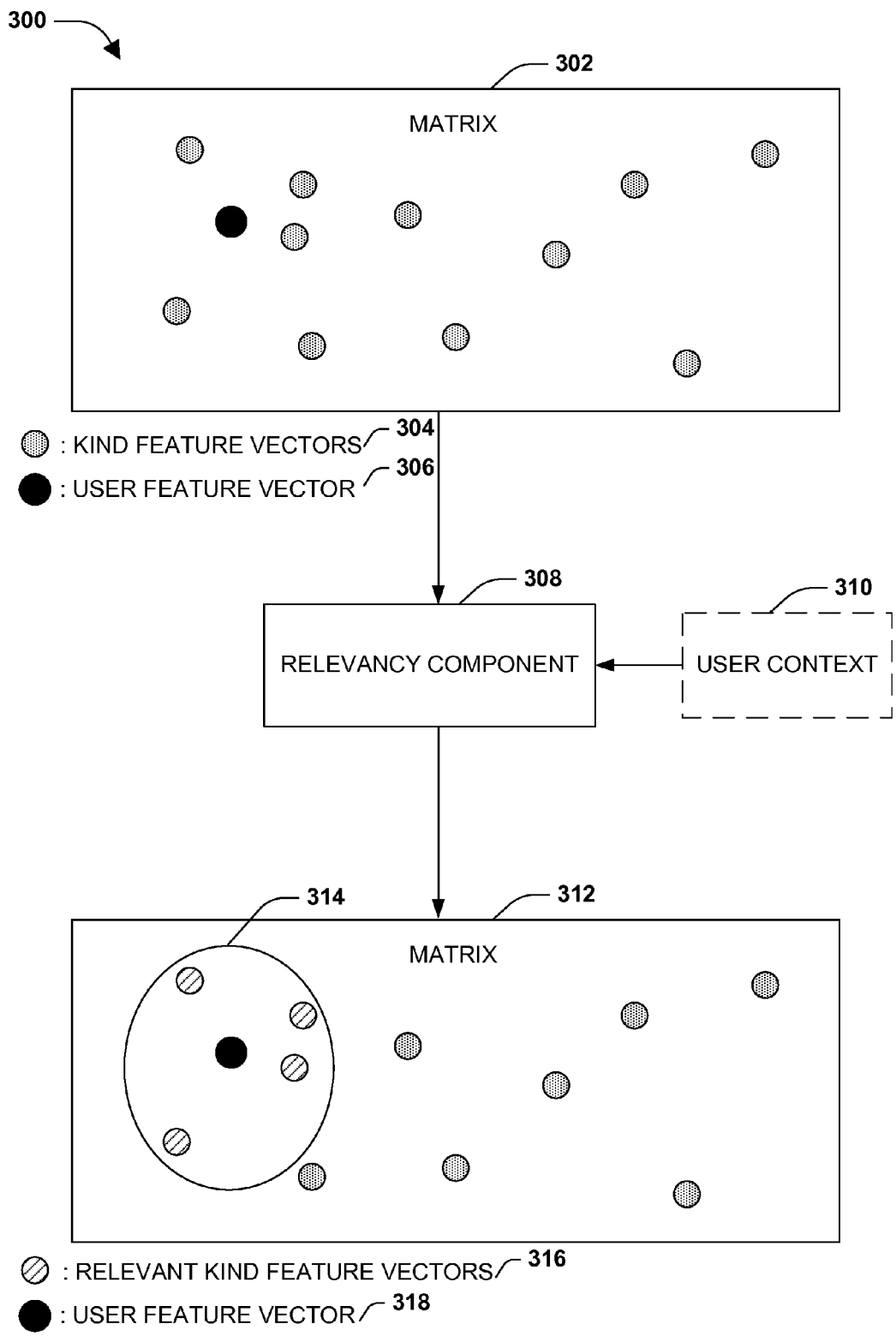
FIG. 3 is a component block diagram illustrating an exemplary system for managing feature vectors.

FIG. 3 illustrates an example 300 of a system configured for managing feature vectors. The system may comprise a relevancy component 308 configured to determine a user context 310 with which a user is engaged with a computer resource. The relevancy component 308 may be configured to classify one or more Kind feature vectors (e.g., Kind feature vectors 304 within a matrix 302) as relevant with respect to a user feature vector (e.g., a user feature vector 306 within the matrix 302) in view of the user context 310 using an unsupervised clustering technique.

In one example, the Kind feature vectors 304 and the user feature vector 306 may be plotted within the matrix 302. For example, the user feature vector 306 may comprise one or more dimensions, wherein a dimension comprises a probabilistic value that the user relates to a characteristic of the dimension. The user feature vector 306 may be plotted within the matrix 302 based upon the one or more dimensions of the user feature vector 306, thus the location of the user feature vector 306 may be analyzed to determine what characteristics the user relates to in varying degrees. A kind feature vector may be plotted within the matrix based upon one or more dimensions of the kind feature vector (e.g., plotted based upon probabilistic values of the one or more dimensions). Thus, the kind feature vectors 304 and the user feature vector 306 may be compared using unsupervised clustering techniques to determine one or more Kind feature vectors that are relevant to the user feature vector based upon characteristics as defined by respective dimensions of the one or more Kind feature vectors and the user feature vector.

In one example, the relevancy component 308 may determine the user context 310. The relevancy component 208 may execute the unsupervised clustering technique upon the matrix 302 to determine relevant Kind feature vectors 316 with respect to the user feature vector 318 as illustrated in matrix 312 (e.g., the matrix 302 after the one or more Kind feature vectors are classified as relevant). A mathematical cluster 314 may be created based upon the relevant Kind feature vectors 316 within the matrix 312.

In one illustrative example, a user may write a blog about cooking salmon. The relevancy component 308 may determine the user context 310 is cooking. The matrix 302 may be a data structure comprising the user feature vector 306. It may be appreciated that the user feature vector 306 may be analyzed to determine what characteristics the user may be interested in (e.g., a high probabilistic value may be assigned to dimensions relating to cooking, groceries, vacations, cars, apples, tuna, boats, etc). Kind feature vectors 304 may also be plotted within the matrix 302 (e.g., Kind feature vectors associated with Kinds relating to cooking, colors, houses, groceries, vacations, and/or hundreds of thousands of other Kinds).

The relevancy component 308 may execute an unsupervised clustering technique upon the matrix 302 to determine a mathematical cluster 314 comprising the relevant Kind feature vectors 316. For example, Kind feature vectors relating to cooking, groceries, tuna, and apples may be classified as relevant and grouped into the mathematical cluster 314 based upon the characteristics of the user (e.g., the user's interests), the characteristics of the Kind feature vectors, and the user context 310. Kinds associated with the relevant Kind feature vectors may be presented to the user (e.g., grocery coupons, new recipes for tuna, etc.)

Figure 4:
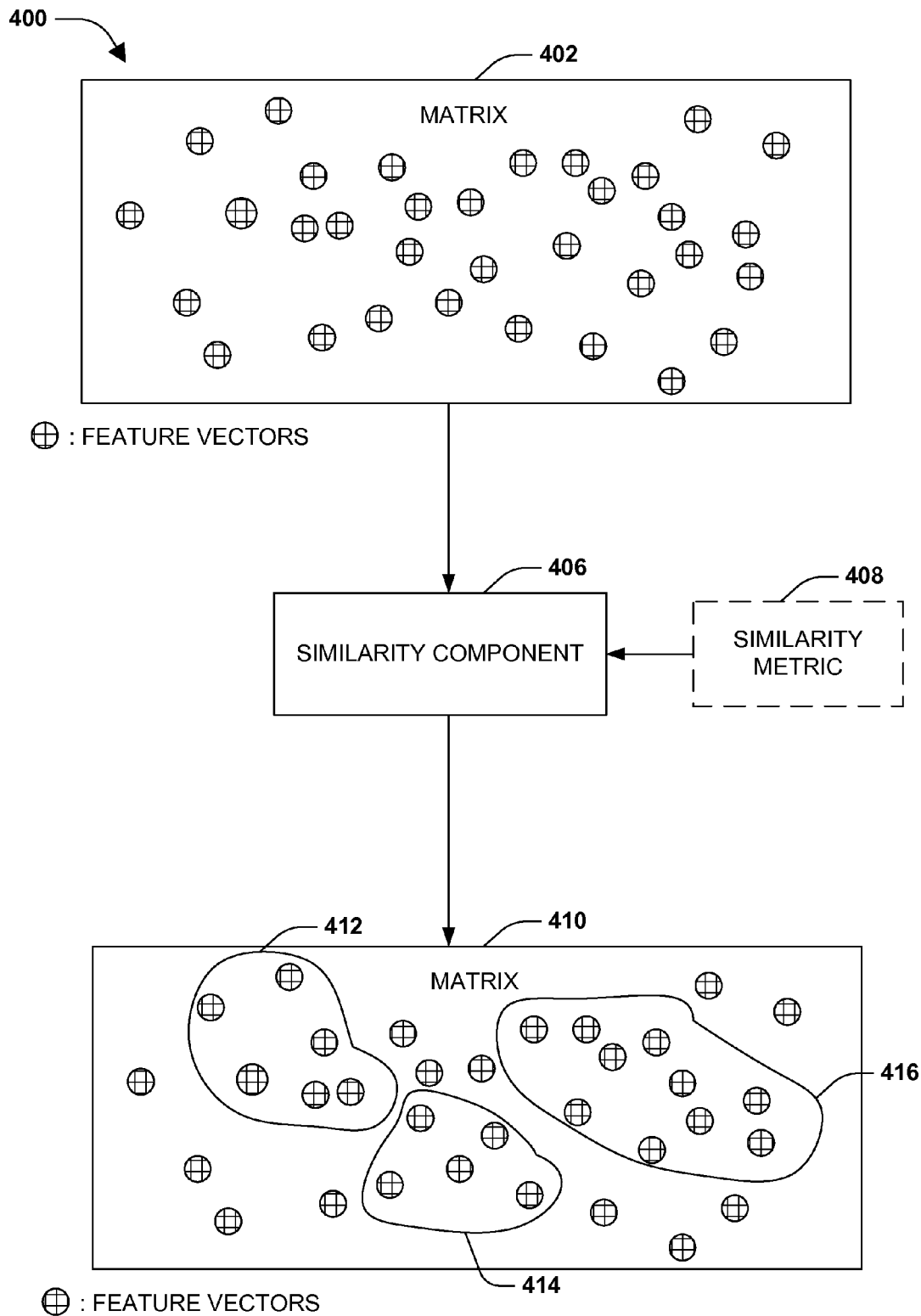
FIG. 4 is a component block diagram illustrating an exemplary system for managing feature vectors.

FIG. 4 illustrates an example 400 of a system configured for managing feature vectors. The system may comprise a similarity component 406 configured to create a mathematical cluster (e.g., a mathematical cluster (1) 412, a mathematical cluster (2) 414, and a mathematical cluster (3) 416) comprising one or more feature vectors using an unsupervised clustering technique in view of a similarity metric (e.g., a similarity metric 408). It may be appreciated that the one or more feature vectors may comprise one or more user feature vectors and/or one or more Kind feature vectors.

In one example, a matrix 402 may comprise one or more feature vectors plotted within the matrix 402 based upon respective characteristics of the one or more feature vectors. For example, the matrix 402 may be a multidimensional matrix, wherein a feature vector may be plotted based upon one or more dimensions associated with characteristics of the feature vector. The similarity component 406 may receive a similarity metric 408 comprising a type characteristic. The similarity component 406 may create one or more mathematical clusters within a matrix 410 (e.g., the matrix 402 after the unsupervised cluster technique is executed) based upon feature vectors having similar types. That is, the mathematical cluster (1) 412 may comprise a baseball Kind feature vector, a soccer ball Kind feature vector, a football Kind feature vector, etc., wherein the similar type is balls. The mathematical cluster (2) 414 may comprise a soccer jersey Kind feature vector, a dress Kind feature vector, a shoe Kind feature vector, etc., wherein the similar type is clothes. The mathematical cluster (3) 416 may comprise a hood Kind feature vector, a door Kind feature vector, a metal Kind feature vector, a tire Kind feature vector, etc., wherein the similar type is car.

Creating mathematical clusters allows for feature vectors to be grouped as similar based upon feature vectors having similar characteristics, which may be determined through analysis of the matrix 402 within which they are plotted. This may be accomplished by plotting the feature vectors within a matrix based upon their characteristics. The unsupervised clustering technique may be executed upon the matrix to determine which feature vectors are similar with respect to one another (e.g., determining similarity based upon spatial distance from one another within the matrix), thus defining mathematical clusters of feature vectors having similar characteristics within the matrix 410.

Figure 5:
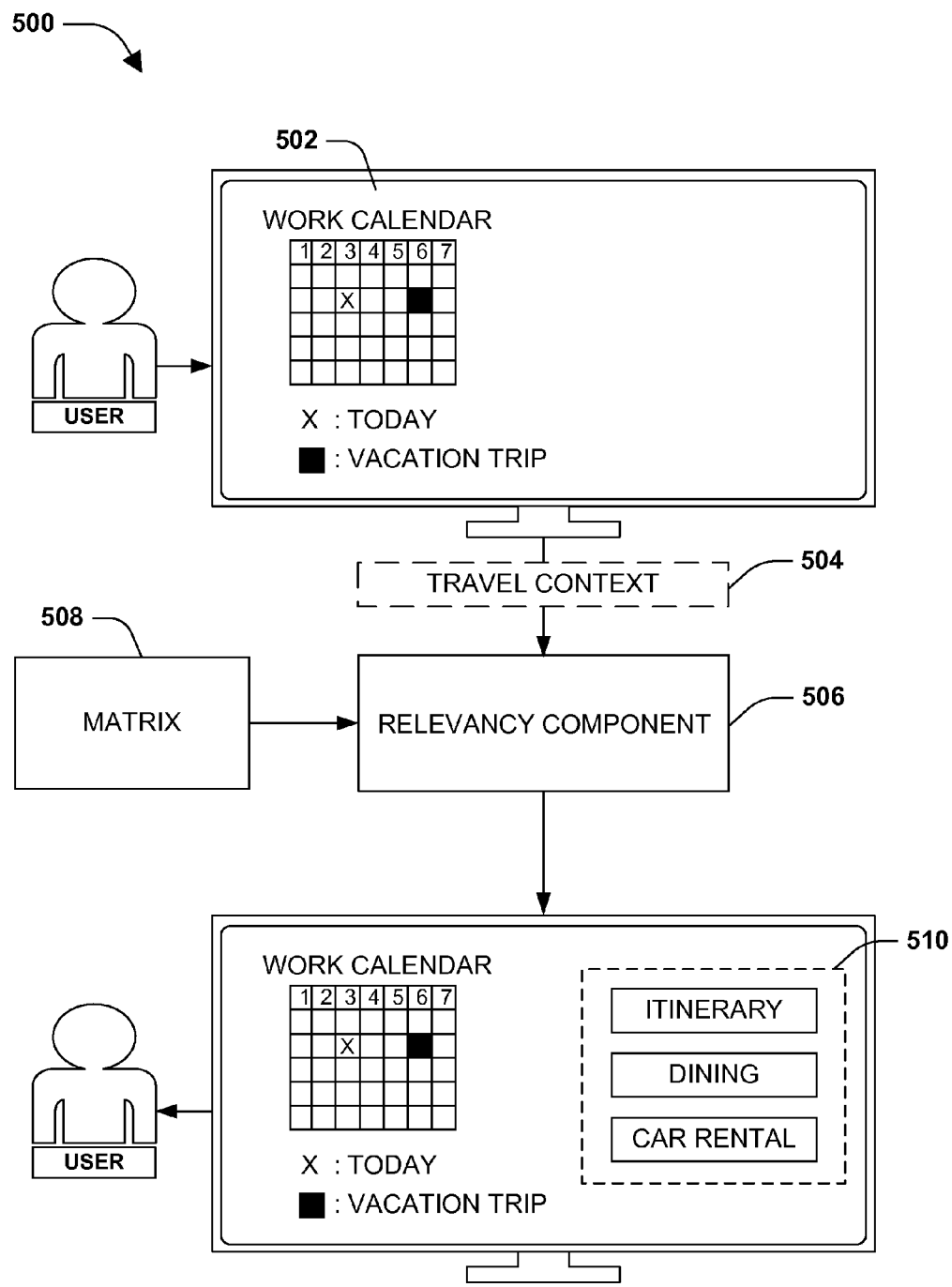
FIG. 5 is an illustration of an example of presenting one or more Kinds based upon determining a relevancy between one or more Kinds and a user.

FIG. 5 illustrates an example 500 of presenting one or more Kinds based upon determining a relevancy between one or more Kinds (e.g., Kinds associated with Kind feature vectors) and a user (e.g., a user associated with a user feature vector). A user may access a work calendar 502 through a computing device (e.g., a cell phone, a personal computer, etc.). A relevancy component 506 may initially determine that the user is accessing a work calendar and thus may be within a work context, but the relevancy component 506 may further determine that a vacation trip is coming up. Based upon the upcoming vacation trip, the relevancy component 506 may determine a user context as a travel context 504.

It may be advantageous to present the user with Kinds associated with travel, which may be relevant to the user. A matrix 508 may comprise Kind feature vectors and a user feature vector plotted within the matrix 508 based upon their respective characteristics. The relevancy component 506 may execute an unsupervised clustering technique upon the matrix 508 to classify one or more Kind feature vectors as relevant with respect to a user feature vector in view of the travel context 504. For example, an itinerary Kind feature vector, a restaurant Kind feature vector (e.g., the user may have a strong interest in dining), a car rental Kind feature vector, etc. may be determined as relevant. A mathematical cluster comprising the one or more Kind feature vectors classified as relevant may be created. Kinds 510 associated with the Kind feature vectors within the mathematical clustering may be presented to the user. For example, an itinerary Kind (e.g., actual itinerary information of the vacation trip) of the vacation trip, a restaurant Kind (e.g., a website with restaurant ratings), and a car rental Kind (e.g., a list of car rental agencies) may be presented to the user.

Figure 6:
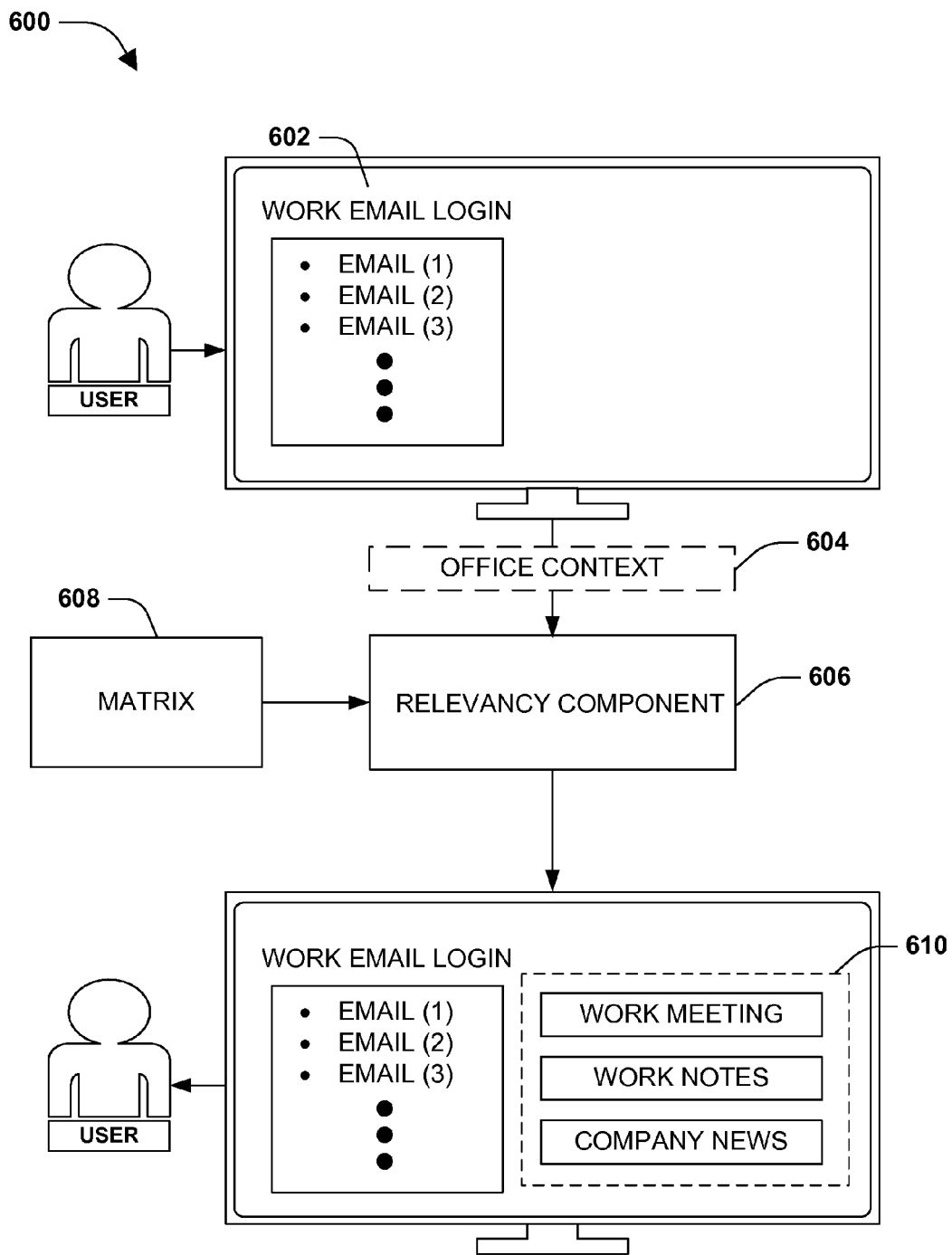
FIG. 6 is an illustration of an example of presenting one or more Kinds based upon determining a relevancy between one or more Kinds and a user.

FIG. 6 illustrates an example 600 of presenting one or more Kinds based upon determining a relevancy between one or more Kinds (e.g., Kinds associated with Kind feature vectors) and a user (e.g., a user associated with a user feature vector). A user may login to their work email 602 through an office computer. A relevancy component 606 may determine the user is accessing their work email and thus may be within an office context 604.

It may be beneficial to present the user with Kinds associated with an office, which may be relevant to the user. A matrix 608 may comprise Kind feature vectors and a user feature vector plotted within the matrix 608 based upon their respective characteristics. The relevancy component 606 may execute an unsupervised clustering technique within the matrix 608 to classify one or more Kind feature vectors as relevant with respect to a user feature vector in view of the office context 604. For example, a meeting Kind feature vector, a work data Kind feature vector, and a company news Kind feature vector (e.g., the user may have a strong interest in current events) may be determined as relevant. A mathematical clustering comprising the one or more Kind feature vectors classified as relevant may be created. Kinds 610 associated with the Kind feature vectors within the mathematical clustering may be presented to the user. For example, a work meeting Kind (e.g., an audio recording of the latest work meeting), a work notes Kind (e.g., a document file comprising notes from a work project), and a company news Kind (e.g., a link to a blog comprising company news information) may be presented to the user.

Figure 7:
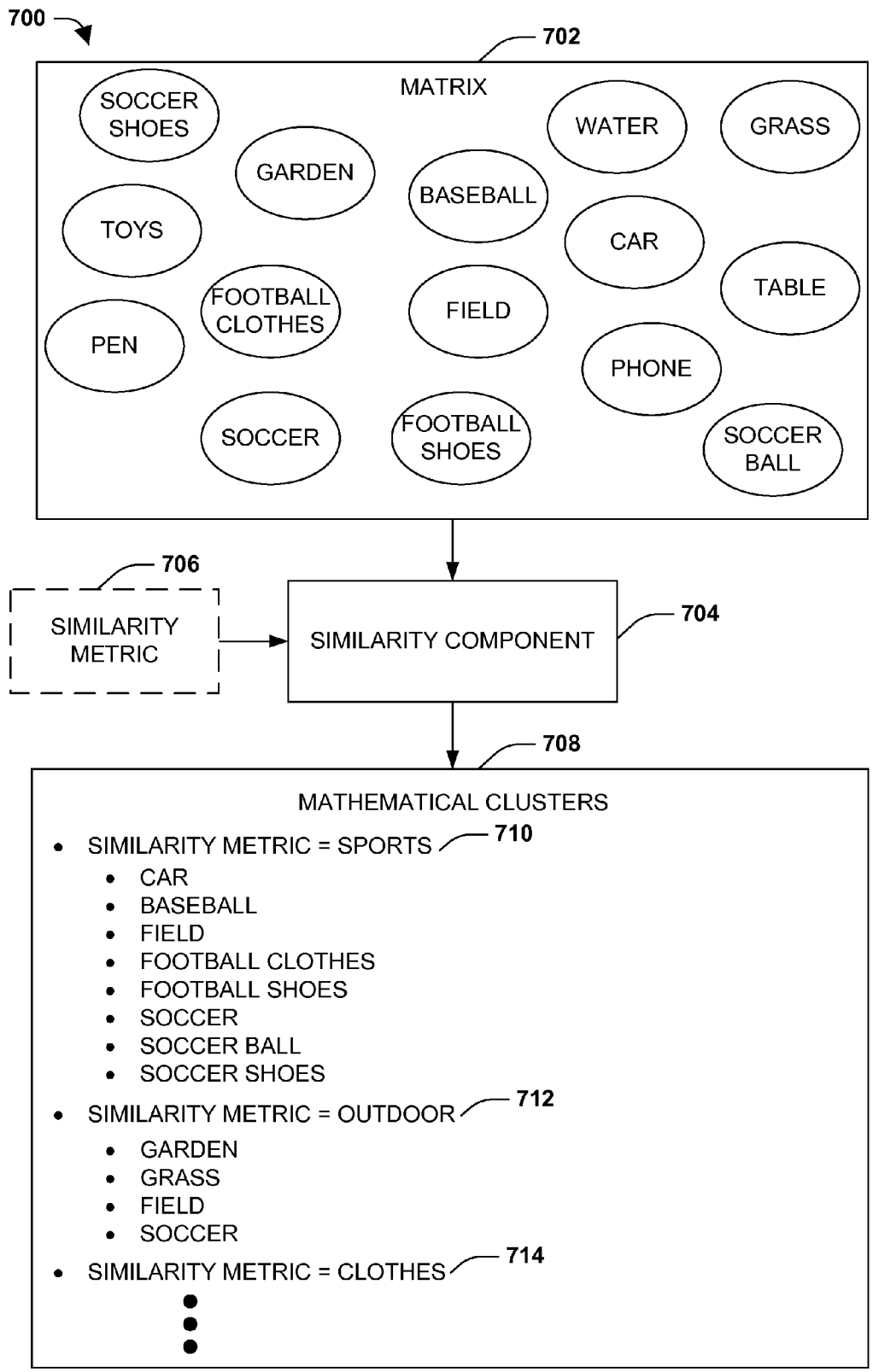
FIG. 7 is an illustration of an example of creating one or more mathematical clusters of feature vectors based upon a similarity metric.

FIG. 7 illustrates an example 700 of creating one or more mathematical clusters of feature vectors based upon a similarity metric. A matrix 702 may comprise one or more feature vectors. A feature vector may be plotted within the matrix 702 based upon characteristics of the feature vector. It may be appreciated that Kind feature vectors and/or user feature vectors may be plotted within the matrix 702. A similarity component 704 may be configured to create one or more mathematical clusters 708 based upon a similarity metric 706, wherein a mathematical cluster may comprise one or more feature vectors within the matrix 702 that are determined as similar by an unsupervised clustering technique.

In one example, the similarity metric 706 may be sports. The similarity component 704 may execute an unsupervised clustering technique upon the matrix 702 to create a sports mathematical cluster 710 comprising one or more feature vectors (e.g., car, baseball, field, football clothes, etc.). The unsupervised clustering technique may determine the one or more feature vectors comprise sports type characteristics based upon their relative position within the matrix 702, for example. The one or more feature vectors within the sports mathematical cluster 710 may be regarded as similar with respect to one another. It may be appreciated that one or more mathematical clusters may be created based upon the similarity metric 706 of sports.

In another example, the similarity metric 706 may be outdoors. The similarity component 704 may execute an unsupervised clustering technique upon the matrix 702 to create an outdoor mathematical cluster 712 comprising one or more feature vectors (e.g., garden, grass, field, and soccer). The unsupervised clustering technique may determine the one or more feature vectors comprise outdoor type characteristics based upon their relative position within the matrix 702, for example. The one or more feature vectors within the outdoor mathematical cluster 712 may be regarded as similar with respect to one another. It may be appreciated that one or more mathematical clusters may be created based upon the similarity metric 706 of outdoor.

In another example, the similarity metric 706 may be clothes. The similarity component 704 may execute an unsupervised clustering technique upon the matrix 702 to create a clothes mathematical cluster 714 comprising one or more feature vectors. The unsupervised clustering technique may determine the one or more feature vectors comprise clothes type characteristics based upon their relative position within the matrix 702, for example. The one or more feature vectors within the clothes mathematical cluster 714 may be regarded as similar with respect to one another. It may be appreciated that one or more mathematical clusters may be created based upon the similarity metric 706 of clothes.

Figure 8:
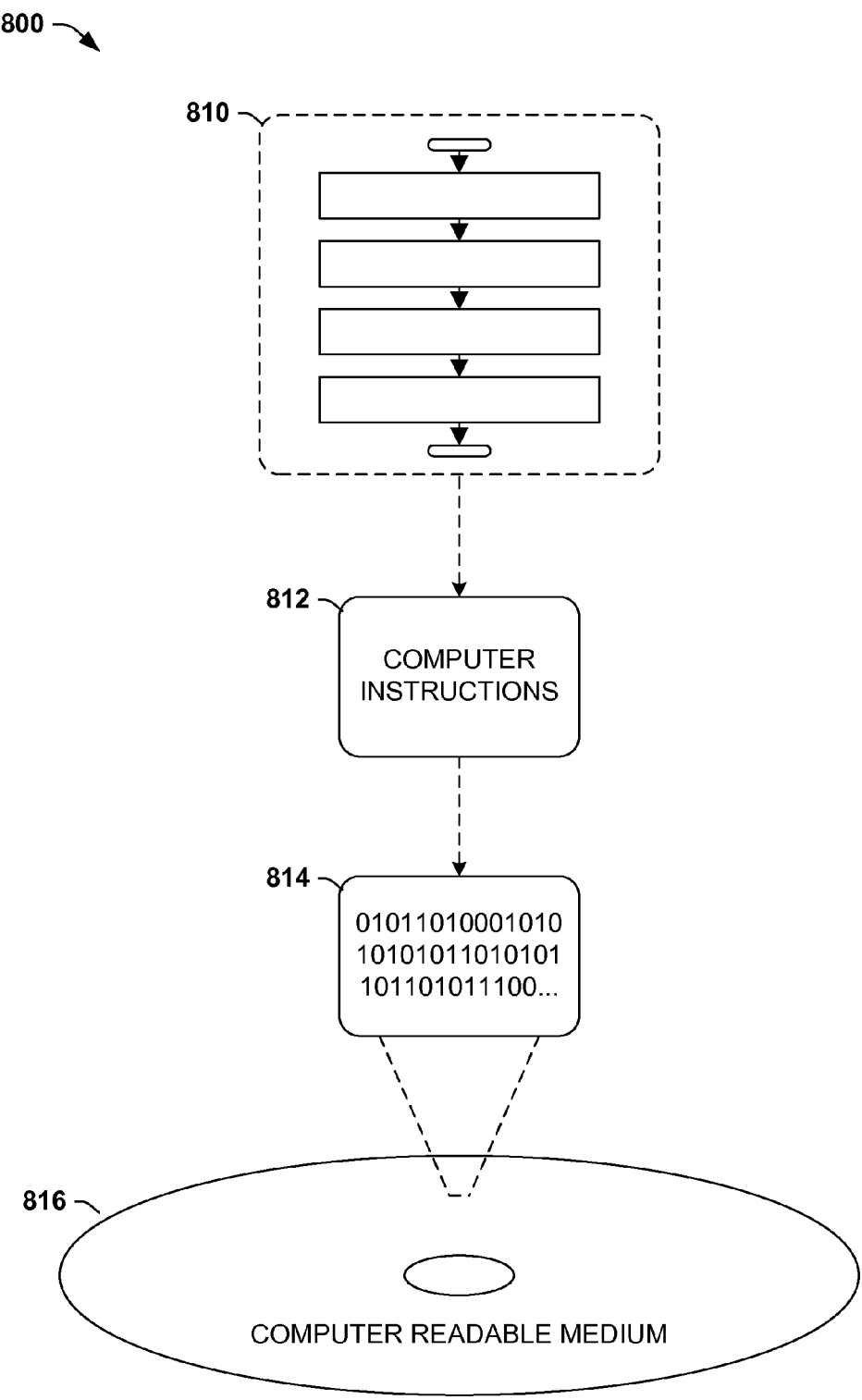
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable instructions 812 may be configured to perform a method 810, such as the exemplary method 100 of FIG. 1 and the exemplary method 200 of FIG. 2, for example. In another such embodiment, the processor-executable instructions 812 may be configured to implement a system, such as the exemplary system 300 of FIG. 3 and the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
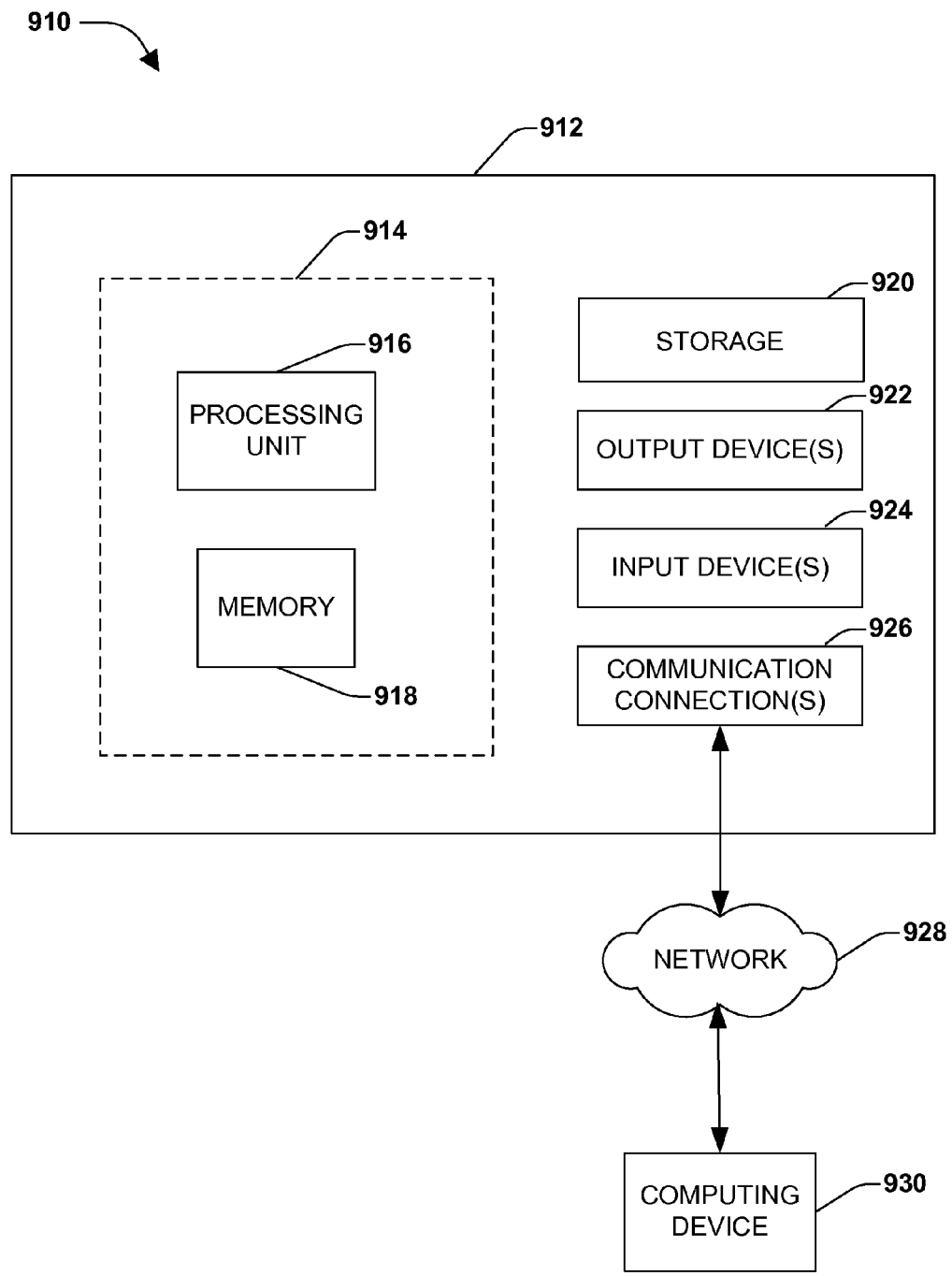
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for determining a user has an interest in a Kind comprising:
    identifying a dimension comprised within a user feature vector of a user, the dimension comprised within the user feature vector having a user interest probability value above an interest threshold value, the user interest probability value specifying a probability that the user has an interest in a characteristic represented by the dimension;
    identifying a Kind feature vector of a Kind based upon the Kind feature vector comprising the dimension, the dimension comprised within the Kind feature vector having a Kind relevancy probability value above a relevancy threshold value, the Kind relevancy probability value specifying a probability that the Kind relates to the characteristic represented by the dimension, the Kind representing a non-digital entity; and
    determining that the user has an interest in the Kind based upon the Kind relevancy probability value being above the relevancy threshold value and the user interest probability value being above the interest threshold value.

2. The method of claim 1, the identifying a Kind feature vector comprising:
    plotting the user feature vector and the one or more Kind feature vectors within a matrix;
    creating a mathematical cluster comprising at least one Kind feature vector within the matrix using an unsupervised clustering technique; and
    identifying the Kind feature vector within the mathematical cluster.

3. The method of claim 1, comprising:
    determining a user context based upon a context with which the user is engaged with a computer resource; and
    identifying the dimension comprised within the user feature vector based upon the user context.

4. The method of claim 2, the creating a mathematical cluster comprising:
    computing a metric distance between the user feature vector and the at least one Kind feature vector within the matrix using the unsupervised clustering technique.

5. The method of claim 2, the unsupervised clustering technique comprising a cosine similarity operation comprising a dot product or an inner product.

6. The method of claim 2, the unsupervised clustering technique comprising a Laplacian.

7. The method of claim 2, the unsupervised clustering technique comprising at least one of a Euclidian distance, a Kernel method, an SVM framework, or a principle component analysis.

8. The method of claim 3, the determining a user context comprising:
determining the user context based upon at least one of user email data, user calendar data, prior user internet search data, prior user interactions with an application, or current user interactions with the application.

9. The method of claim 1, the Kind representing a tangible entity.

10. The method of claim 1, comprising:
presenting content associated with the Kind to the user.

11. A system for determining a user has an interest in a Kind comprising:
a relevancy component configured to:
identify a dimension comprised within a user feature vector of a user, the dimension comprised within the user feature vector having a user interest probability value above an interest threshold value, the user interest probability value specifying a probability that the user has an interest in a characteristic represented by the dimension;
identify a Kind feature vector of a Kind based upon the Kind feature vector comprising the dimension, the dimension comprised within the Kind feature vector having a Kind relevancy probability value above a relevancy threshold value, the Kind relevancy probability value specifying a probability that the Kind relates to the characteristic represented by the dimension, the Kind representing a non-digital entity; and
determine that the user has an interest in the Kind based upon the Kind relevancy probability value being above the relevancy threshold value and the user interest probability value being above the interest threshold value, at least some of the relevancy component implemented at least in part via a processing unit.

12. The system of claim 11, the relevancy component configured to:
plot the user feature vector and one or more Kind feature vectors within a matrix;
create a mathematical cluster comprising at least one Kind feature vector within the matrix using an unsupervised clustering technique; and
identify the Kind feature vector within the mathematical cluster.

13. The system of claim 11, the relevancy component configured to:
determine a user context based upon a context with which the user is engaged with a computer resource; and
identify the dimension comprised within the user feature vector based upon the user context.

14. The system of claim 12, the relevancy component configured to:
compute a metric distance between the user feature vector and the at least one Kind feature vector within the matrix using the unsupervised clustering technique.

15. The system of claim 12, the unsupervised clustering technique comprising a cosine similarity operation comprising a dot product or an inner product.

16. The system of claim 12, the unsupervised clustering technique comprising a Laplacian.

17. The system of claim 12, the unsupervised clustering technique comprising at least one of a Euclidian distance, a Kernel method, an SVM framework, or a principle component analysis.

18. The system of claim 13, the relevancy component configured to:
determine the user context based upon at least one of user email data, user calendar data, prior user internet search data, prior user interactions with an application, or current user interactions with the application.

19. The system of claim 11, the relevancy component configured to:
present content associated with the Kind to the user.

20. A computer-readable memory comprising processor-executable instructions that when executed perform a method for determining a user has an interest in a Kind comprising:
identifying a dimension comprised within a user feature vector of a user, the dimension comprised within the user feature vector having a user interest probability value above an interest threshold value, the user interest probability value specifying a probability that the user has an interest in a characteristic represented by the dimension; and
identifying a Kind feature vector of a Kind based upon the Kind feature vector comprising the dimension, the dimension comprised within the Kind feature vector having a Kind relevancy probability value above a relevancy threshold value, the Kind relevancy probability value specifying a probability that the Kind relates to the characteristic represented by the dimension, the Kind representing a non-digital entity.

* * * * *